(12) United States Patent
Guedot et al.

(10) Patent No.: US 12,473,844 B2
(45) Date of Patent: Nov. 18, 2025

(54) MODULE OF AN AIRCRAFT TURBINE ENGINE

(71) Applicant: SAFRAN HELICOPTER ENGINES, Bordes (FR)

(72) Inventors: Thomas Louis Guedot, Moissy-Cramayel (FR); Jean-Maurice Casaux-Bic, Moissy-Cramayel (FR); Thomas Gricourt, Moissy-Cramayel (FR); Antoine Thomas Quentin Le Bonniec, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 23 days.

(21) Appl. No.: 17/595,752

(22) PCT Filed: May 26, 2020

(86) PCT No.: PCT/FR2020/050873
§ 371 (c)(1),
(2) Date: Nov. 23, 2021

(87) PCT Pub. No.: WO2020/240129
PCT Pub. Date: Dec. 3, 2020

(65) Prior Publication Data
US 2022/0213808 A1 Jul. 7, 2022

(30) Foreign Application Priority Data
May 29, 2019 (FR) ..................... 1905769

(51) Int. Cl.
*F01D 25/24* (2006.01)
*F01D 25/16* (2006.01)
(Continued)

(52) U.S. Cl.
CPC ............. *F01D 25/24* (2013.01); *F01D 25/16* (2013.01); *F01D 25/243* (2013.01); *F23R 3/60* (2013.01);
(Continued)

(58) Field of Classification Search
CPC .... F01D 25/16; F01D 25/243; F05D 2220/32; F05D 2230/31; F05D 2240/14; F05D 2240/35; F05D 2240/50; F23R 3/54
See application file for complete search history.

(56) References Cited

U.S. PATENT DOCUMENTS 3,528,241 A * 9/1970 Gill, Jr. ................... F02C 7/06
184/6
4,462,204 A * 7/1984 Hull ........................ F23R 3/26
415/115
(Continued)

FOREIGN PATENT DOCUMENTS

DE 102011108957 A1 1/2013
EP 2940324 A1 11/2015
(Continued)

OTHER PUBLICATIONS

International Search Report received for PCT Patent Application No. PCT/FR2020/050873, mailed on Sep. 23, 2020, 6 pages (2 pages of English Translation and 4 pages of Original Document).

*Primary Examiner* — Nathaniel E Wiehe
*Assistant Examiner* — Aye S Htay
(74) *Attorney, Agent, or Firm* — WOMBLE BOND DICKINSON (US) LLP

(57) ABSTRACT

A module for an aircraft turbine engine including at least one annular casing of an annular combustion chamber, at least one sealing ring for a turbine wheel, and at least one annular bearing support, wherein this module is made in one piece.

11 Claims, 3 Drawing Sheets

(51) Int. Cl.
*F23R 3/60* (2006.01)
*B22F 10/20* (2021.01)
(52) U.S. Cl.
CPC .......... *B22F 10/20* (2021.01); *F05D 2220/32* (2013.01); *F05D 2230/31* (2013.01); *F05D 2240/14* (2013.01); *F05D 2240/35* (2013.01); *F05D 2240/50* (2013.01)

(56) References Cited

U.S. PATENT DOCUMENTS

| | | | | |
|---|---|---|---|---|
| 5,727,378 | A * | 3/1998 | Seymour | F01D 25/125 |
| | | | | 60/738 |
| 2003/0110778 | A1* | 6/2003 | Karafillis | F01D 25/18 |
| | | | | 60/785 |
| 2016/0024926 | A1* | 1/2016 | Jaureguiberry | F01D 9/04 |
| | | | | 416/182 |
| 2017/0067640 | A1 | 3/2017 | Savary et al. | |
| 2017/0314468 | A1* | 11/2017 | Wotzak | F01D 25/183 |
| 2018/0135517 | A1* | 5/2018 | Mook | F04D 29/541 |
| 2019/0093893 | A1* | 3/2019 | Clemen | F23R 3/286 |
| 2020/0362724 | A1* | 11/2020 | Binek | F23R 3/54 |

FOREIGN PATENT DOCUMENTS

| | | | |
|---|---|---|---|
| EP | 3069821 | A2 | 9/2016 |
| EP | 3444441 | A1 | 2/2019 |
| FR | 3017693 | A1 | 8/2015 |
| WO | 2014/140493 | A1 | 9/2014 |

\* cited by examiner

MODULE OF AN AIRCRAFT TURBINE ENGINE

TECHNICAL SCOPE OF THE INVENTION

The present invention relates to an aircraft turbine engine module.

TECHNICAL BACKGROUND

The prior art includes, in particular, the documents WO-A1-2014/140493, FR-A1-3 017 693, EP-A2-3 069 821, EP-A1-2 940 324, DE-A1-10 2011 108957 and EP-A1-3 444 441.

An aircraft turbine engine, for example of an aeroplane or helicopter, comprises an air inlet feeding a gas generator which comprises from upstream to downstream, by reference to the gas flow, at least one compressor, an annular combustion chamber, and at least one turbine.

A turbine of a turbine engine comprises one or more expansion stages comprising a bladed nozzle forming a stator, and a bladed wheel forming a rotor. The nozzle is attached to a casing and the wheel comprises a disc with blades on its periphery. The wheel rotates within the casing and it is known to provide a sealing ring around this wheel to limit the passage of gas between the tops of the blades and the casing and thus to ensure that as much of the combustion gas leaving the chamber as possible passes through the wheel to optimise the efficiency of the turbine engine.

A sealing ring typically comprises an annular body extending around an axis of revolution and comprising an outer surface and an inner surface which is coated with an annular sealing layer of abradable material on which the tops of the blades can rub in operation.

There are currently two sealing ring technologies. The ring according to the first technology comprises a single-piece annular body which is attached by suitable means to a casing. The ring according to the second technology comprises a sectorised annular body, the sectors of the body being attached independently of each other to the casing.

In both technologies, the ring is surrounded by an annular wall which includes orifices for the passage of impact cooling air on the outer surface of the body of the ring. This cooling allows for better control of the thermal behaviour of the ring during operation and thus optimises the radial clearances between the body of the ring and the tops of the blades of the wheel during operation.

The first technology is interesting from the point of the view of the optimisation of the mass and dimensions, while the second is interesting from a point of view of the ability to optimise the cooling and therefore the adjustment of the clearances with the tops of the blades, as well as the maintenance and easy replacement of each ring sector.

The present invention provides an improvement to these existing techniques. In particular, it aims to reduce the number of elements for the construction of a ring and a turbine engine module, so as to limit the number of fastening systems (screws, bolts, flanges, etc.), the risks of leakage between these elements, the mass of the turbine engine, etc.

SUMMARY OF THE INVENTION

The present invention relates to a module for an aircraft turbine engine, this module comprising:
  at least one annular casing of an annular combustion chamber,
  at least one sealing ring for a turbine wheel, and
  at least one annular bearing support,
  characterised in that this module is made in one piece.

The production of the module in one piece allows to simplify its design and manufacture, this production being preferably carried out by additive manufacturing. It is no longer necessary to provide systems for fixing the elements of the module, which simplifies and lightens the module.

The module according to the invention may comprise one or more of the following features, taken alone or in combination with each other:
  the module comprises two annular casings, respectively inner and outer, defining between them an annular recess configured to receive an annular combustion chamber,
  the outer casing comprises at its upstream end an annular flange for fixing the module,
  the module comprises two sealing rings, upstream and downstream respectively, each of these sealing rings comprising an annular body and an annular wall extending around the annular body and at a radial distance from this body,
  the upstream ring, and in particular its annular wall, is connected to said inner annular casing,
  said bearing support(s) comprises two annular shrouds, respectively inner and outer, connected together by arms extending substantially radially with respect to an axis of the module,
  the outer shroud extends between the upstream and downstream rings and is connected to the downstream ring by an elastically deformable annular part,
  the inner shroud extends around an inner ring gear and is connected to this inner ring gear, this ring gear comprising at least one cylindrical surface for mounting a roller bearing,
  the downstream ring is connected by an outer ring gear to a junction zone between said inner and outer annular casings,
  the outer ring gear comprises at its downstream end an annular flange for fixing the module.

The present invention also relates to a method for manufacturing a module as described above, characterised in that it is obtained by additive manufacturing.

BRIEF DESCRIPTION OF THE FIGURES

Other features and advantages of the invention will become apparent in the course of the detailed description which follows, for the understanding of which reference is made to the appended drawings in which.

DETAILED DESCRIPTION OF THE INVENTION

Figure 1:
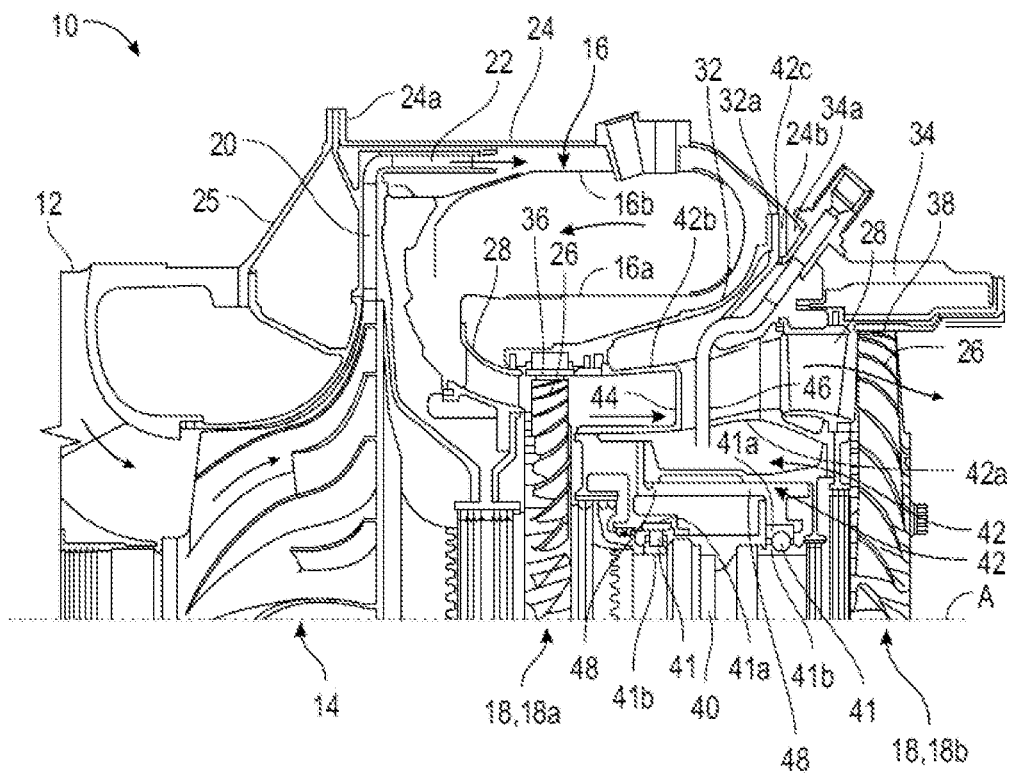
FIG. 1 is a schematic half-view in axial section of a part of an aircraft turbine engine.

FIG. 1 shows part of an aircraft turbine engine 10 such as a helicopter turbojet engine.

The turbine engine 10 comprises from upstream to downstream, with reference to the direction of gas flow (see arrows), an air inlet 12, at least one compressor 14, an annular combustion chamber 16, and at least one turbine 18.

The air entering the engine through the air inlet 12 is compressed in the compressor 14, which is a centrifugal compressor. The compressed air exits radially outwards and feeds the combustion chamber 16 via an annular assembly forming a rectifier 20 and a diffuser 22.

The combustion chamber 16 comprises two annular walls, respectively inner 16a and outer 16b, which extend around each other and which are themselves arranged inside an outer casing 24 of the combustion chamber 16.

This casing 24 comprises at its upstream end an annular flange 24a for attachment to annular flanges of the rectifier-diffuser assembly 20-22 as well as a casing 25 of the compressor 14 and the air inlet 12.

The compressed air is mixed with fuel and burned in the combustion chamber 16, generating combustion gases which are then injected into the turbines 18.

A high-pressure turbine stage 18a is located just downstream of the outlet of the combustion chamber 16 and comprises a stator nozzle 28 and a rotor wheel 26. A low-pressure turbine stage 18b is located downstream of the stage 18a and also comprises a nozzle 30 and a rotor wheel 26.

A turbine nozzle comprises an annular row of fixed blades for straightening the gas stream, and a turbine wheel comprises an annular row of blades carried by a rotor disc.

The casing 24 further comprises at its downstream end an annular flange 24b for attachment to support flanges for sealing rings 36, 38.

A casing 32 extends within the wall 16a and carries at its upstream end the sealing ring 36 which extends around the wheel 26 of the stage 18a, and at its downstream end a flange 32a for attachment to the flange 24b. A casing 34 carries the sealing ring 38 which extends around the wheel 26 of the stage 18b. This casing 34 comprises a flange 34a for attachment to the flanges 32a, 24b.

Each sealing ring 36, 38 comprises an inner cylindrical surface which is coated with an annular abradable layer configured to rub against the tops of the blades of the wheel 26 to minimise gas leakage in that zone. However, the abradable layer is optional. It may also be present on one of the rings, for example the ring 36, and be absent from the other ring 38. This abradable layer may have a thermal protection function.

The wheels 26 are connected to each other by a shaft 40 which is further connected to the impeller of the centrifugal compressor 14. The shaft 40 is guided in rotation by rolling bearings 41 which are carried by an annular support 42 interposed between the two stages 18a, 18b.

The bearing support 42 comprises two annular shrouds, respectively inner 42a and outer 42b, connected together by an annular row of arms 44 extending substantially radially with respect to the axis A of rotation of the shaft 40. The arms 44 are tubular and may be used for the passage of utilities 46 such as fluid lines or electrical cables.

The bearing support 42 is mounted inside the casing 32 and carries a bearing housing which comprises a ring gear 48 for supporting the outer bushings 41a of the bearings 41. The bearings 41 are here two in number, an upstream roller bearing and a ball bearing, the inner bushings 41b of which are mounted directly on the shaft 40.

Figure 2:
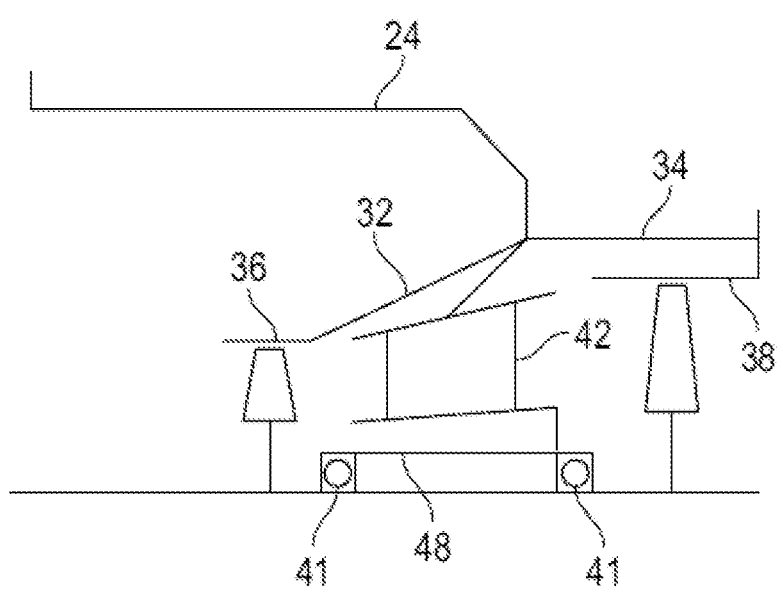
FIG. 2 is a very schematic half-view in axial section of a part of an aircraft turbine engine, according to the prior art.

FIG. 2 shows very schematically the current state of the art in the manufacture and assembly of several elements visible in FIG. 1.

Firstly, the sealing rings 36, 38 are made independently of each other and of the other surrounding parts. They are attached by flanges or hooks to casings 32, 34 which are themselves attached by flanges to the outer casing 24 of the chamber. The bearing support 42 is also attached by a flange to this casing 24.

Figure 3:
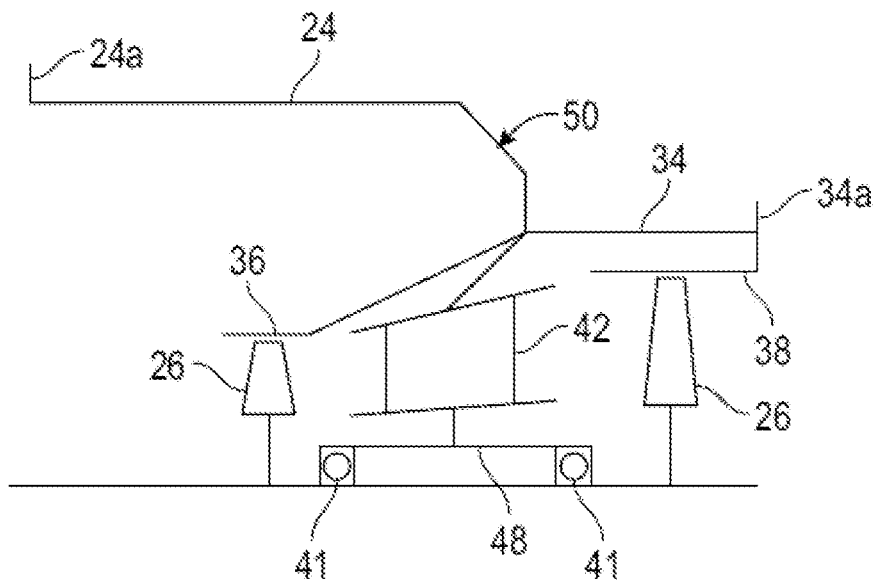
FIG. 3 is a very schematic half-view in axial section of a part of an aircraft turbine engine, according to an aspect of the invention.

FIG. 3 illustrates an aspect of the invention which consists in providing a module 50 which is single-piece, i.e. formed in one piece preferably by additive manufacturing, and including several of the aforementioned elements.

In the example shown, the module 50 comprises the casing 24, the sealing rings 36, 38 and at least part of the bearing support 42.

Figure 4:
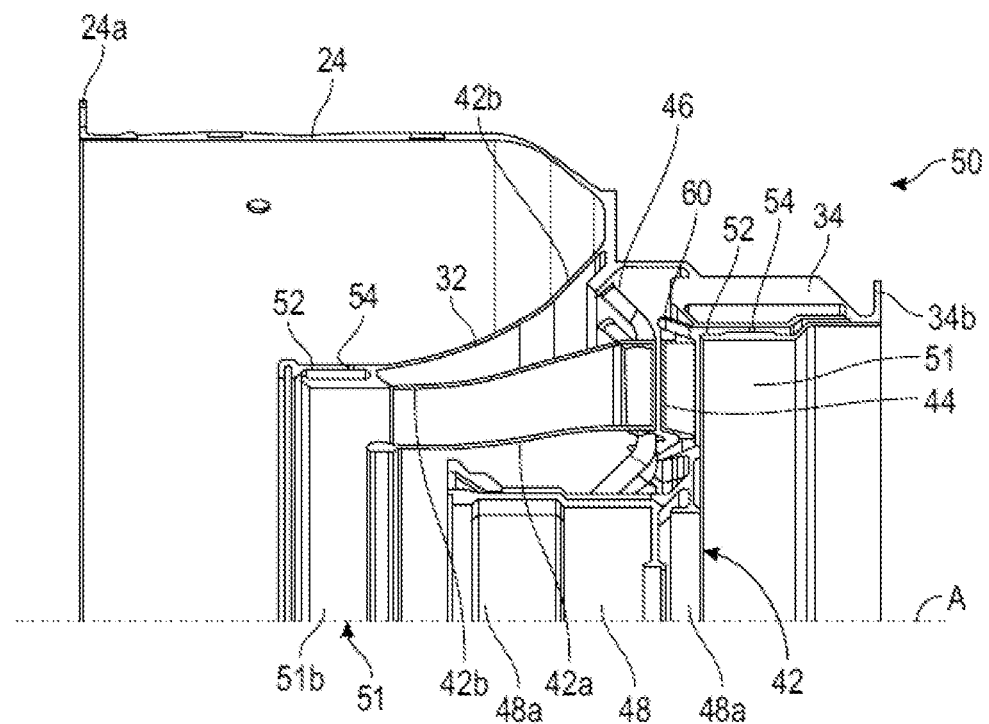
FIG. 4 is a schematic half-view in axial section of a turbine engine module, according to an aspect of the invention.
Figure 5:
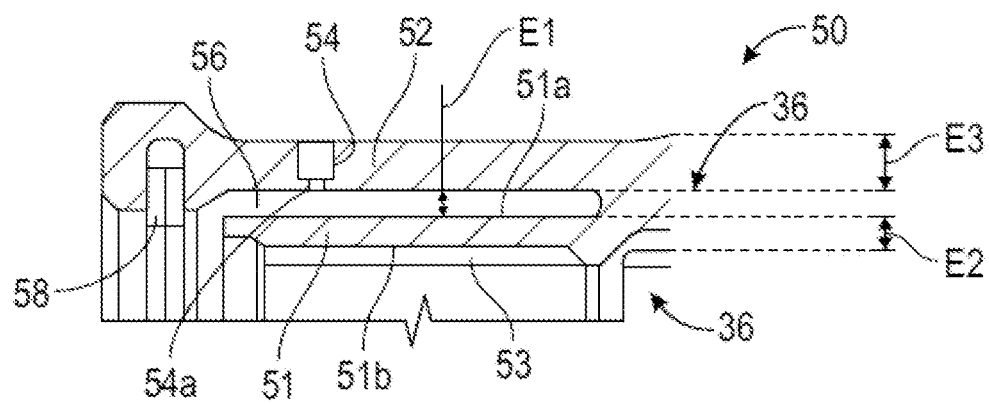
FIG. 5 is an enlarged schematic view of a detail of FIG. 4 and shows another aspect of the invention.

FIG. 4 represents a more concrete embodiment of this module 50 and FIG. 5 is a detail view of FIG. 4 and more specifically illustrates another aspect of the invention relating to the sealing rings 36, 38.

Each sealing ring 36, 38 advantageously comprises an annular body 51 extending about the axis A and comprising an outer surface 51a and an inner surface 51b which is coated with an annular layer 53 of an abradable material.

The ring 36, 38 further comprises an annular wall 52 extending around the annular body 51 and at a radial distance from this body. This annular wall 52 comprises orifices 54 for the passage of impact cooling air over the outer surface 51a. As can be clearly seen in FIG. 5, the body 51 and the wall 52 are formed in one piece and these elements and the orifices 54 are advantageously obtained by additive manufacturing.

The body 51 and the wall 52 define between them an annular space 56 which is closed at a downstream end and open at an upstream end. This space 56 has a radial thickness E1 less than or equal to that E2 of the body 51 and/or less than or equal to that E3 of the wall 52.

The following description applies more specifically to the ring 36 illustrated in FIG. 5.

The wall 52 comprises at its upstream end an annular groove open radially inwards and in which is mounted an annular sealing member 58 which is configured to cooperate with the nozzle 28 of the upstream stage 18a mentioned above.

The wall 52 extends downstream and is connected to or forms the radially inner annular casing 32 of the combustion chamber 16.

The body 51 extends downstream and is connected to or forms the outer shroud 42b of the bearing support 42.

The wall 52 comprises at least one annular row of air passage orifices 54 evenly spaced around the axis A and oriented in directions substantially radial to that axis. Each of these orifices 54 includes a constriction 54a at its radially inner end to accelerate the air stream through the orifice and improve the impact cooling of the body 51 of the ring 36.

The rings 36, 38 and the assembly of the module 50 may be made of a metal alloy. The layers 53 are advantageously made of ceramic.

Another aspect of the invention relates to a method for manufacturing a ring 36, 38 as well as the module 50 by additive manufacturing.

In the embodiment of the module shown in FIG. 4, the latter comprises:

the two inner 32 and outer 24 casings,
the two sealing rings 36, 38, and
the bearing support 42.

The outer casing 24 comprises at its upstream end the annular flange 24a for fixing the module, for example to the aforementioned flanges of the casing 24 and of the diffuser-rectifier assembly 20-22 of FIG. 2.

As mentioned above, the upstream ring 36, and in particular its annular wall 52, is connected to the inner casing 32.

The outer shroud 42b of the bearing support 42 extends between the rings 36, 38 and is connected to the downstream ring 38 by an elastically deformable annular part 60. This part 60 is relatively flexible and is capable of elastic deformation in the axial and/or radial direction to allow for differential thermal expansions during operation in particular. This part 60, also referred to as a pin, can be used to support the outer shroud 42b which is then not supported by the arms but by this flexible part. The inner shroud 42a can be supported in the same way by means of another flexible part.

The inner shroud 42a of the bearing support 42 extends around the inner ring gear 48 and is connected to this inner ring gear which comprises cylindrical surfaces 48a for mounting the outer bushings 41a of the bearings 41.

The downstream ring 38 is connected by an outer casing 34 to a junction zone between the casings 24, 32. This casing 34 comprises at its downstream end the annular flange 34b for fixing the module 50.

The single-piece construction of each ring 36, 38 allows to simplify its design and manufacture and to integrate all the functions of a ring of the previous technique, including those of retention of the blades in the event of breakage, of aerothermal function, etc.

The ring is cooled by the impact of the air passing through the orifices 54 of the wall 52 during operation. The shape of these orifices 54 and the distance between them and the body 51 (radial thickness E1) are determined to optimise the cooling of the ring and therefore the performances.

The single-piece module 50 allows a significant reduction in mass (in the order of 25 to 30% in the example shown) compared to the prior art.

The additive manufacturing allows these manufacturing and optimisation objectives to be achieved.

The invention claimed is:

1. A module for an aircraft turbine engine, this module comprising:
    at least one annular casing of an annular combustion chamber,
    at least one sealing ring for a turbine wheel, and
    at least one annular bearing support,
    wherein this module is made in one piece,
    wherein said at least one annular bearing support comprises two annular shrouds, respectively inner and outer, connected together by arms extending substantially radially with respect to an axis of the module, and
    wherein said at least one sealing ring includes two sealing rings, respectively upstream and downstream, each of said sealing rings comprising an annular body and an annular wall extending around the annular body and at a radial distance from said body, wherein said outer annular shroud extends between the upstream and downstream sealing rings and is connected to the downstream sealing ring by an elastically deformable annular part.

2. The module according to claim 1, wherein said at least one annular casing comprises:
    two annular casings, respectively inner and outer, defining between them an annular recess configured to receive an annular combustion chamber.

3. The module according to claim 2, wherein said outer annular casing comprises at its upstream end an annular flange for fixing said module.

4. The module according to claim 2, wherein said upstream sealing ring is connected to said inner annular casing.

5. The module according to claim 1, wherein the inner annular shroud extends around an inner ring gear, and is connected to an inner annular casing of said at least one annular casing, said inner annular casing comprising at least one cylindrical surface for mounting a roller bearing.

6. The module according to claim 1, wherein said downstream sealing ring is connected by an outer casing to a junction zone between inner and outer annular casings of the at least one annular casing.

7. The module according to claim 6, wherein said outer annular casing comprises at its downstream end an annular flange for fixing the module.

8. A method of manufacturing a module according to claim 1, wherein said module is obtained by additive manufacturing.

9. A module for an aircraft turbine engine, this module comprising
    at least one annular casing of an annular combustion chamber,
    at least one sealing ring for a turbine wheel, and
    at least one annular bearing support, wherein said module is made in one piece, and wherein said at least one sealing ring comprises two sealing rings, respectively upstream and downstream, each of said sealing rings comprising an annular body and an annular wall extending around the annular body and at a radial distance from said body, and wherein said downstream sealing ring is connected by an outer casing to a junction zone between inner and outer annular casings of said at least one annular casing.

10. A module for an aircraft turbine engine, said module comprising:
    at least one annular casing of an annular combustion chamber,
    at least one cylindrical sealing ring extending around a turbine wheel tip, and
    at least one cylindrical bearing support,
    wherein said module is made in one piece,
    wherein said at least one cylindrical bearing support comprises two annular shrouds, respectively inner and outer, connected together by arms extending substantially radially with respect to an axis of the module,
    and wherein said at least one cylindrical sealing ring includes two cylindrical sealing rings, respectively upstream and downstream, each of said cylindrical sealing rings comprising a cylindrical body and a cylindrical wall extending around the cylindrical body and at a radial distance from said body, wherein said outer annular shroud extends between the upstream and downstream cylindrical sealing rings and is connected to the downstream cylindrical sealing ring by an elastically deformable annular part.

11. A module for an aircraft turbine engine, said module comprising:
    at least one annular casing of an annular combustion chamber,
    at least one cylindrical sealing ring extending around a turbine wheel tip, and
    at least one cylindrical bearing support, wherein said module is made in one piece, and wherein said at least one cylindrical sealing ring comprises two cylindrical sealing rings, respectively upstream and downstream, each of these cylindrical sealing rings comprising a cylindrical body and a cylindrical wall extending around the cylindrical body and at a radial distance from said cylindrical body, and wherein said downstream cylindrical sealing ring is connected by an outer casing to a junction zone between inner and outer annular casings of said at least one annular casing.

* * * * *